United States Patent
Johnson et al.

(10) Patent No.: US 11,788,421 B2
(45) Date of Patent: Oct. 17, 2023

(54) SLOTTED CERAMIC COATINGS FOR IMPROVED CMAS RESISTANCE AND METHODS OF FORMING THE SAME

(71) Applicant: General Electric Company, Schenectady, NY (US)

(72) Inventors: Curtis Alan Johnson, Niskayuna, NY (US); Hrishikesh Keshavan, Watervliet, NY (US); Shankar Sivaramakrishnan, Schenectady, NY (US); Byron Andrew Pritchard, Jr., Loveland, OH (US); Hongqiang Chen, Niskayuna, NY (US); Bernard Patrick Bewlay, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/634,196

(22) Filed: Jun. 27, 2017

(65) Prior Publication Data
US 2018/0371923 A1    Dec. 27, 2018

(51) Int. Cl.
*F01D 5/28*      (2006.01)
*C04B 35/48*    (2006.01)
(Continued)

(52) U.S. Cl.
CPC ............ *F01D 5/288* (2013.01); *B23K 26/364* (2015.10); *C04B 35/48* (2013.01); *C04B 35/505* (2013.01);
(Continued)

(58) Field of Classification Search
CPC ..... B23K 26/364; C04B 35/48; C04B 35/505; F01D 5/288; F01D 5/18; F01D 9/02;
(Continued)

(56) References Cited

U.S. PATENT DOCUMENTS 4,365,933 A * 12/1982 Langer .................... F01D 9/041
                                                                        415/200
4,377,371 A    3/1983 Wisander et al.
(Continued)

FOREIGN PATENT DOCUMENTS

| EP | 1642993 A1 | 4/2006 | |
|---|---|---|---|
| WO | WO-2016039716 A1 * | 3/2016 | ............. F02K 1/822 |
| WO | WO-2016105327 A1 * | 6/2016 | ......... C23C 28/3215 |

OTHER PUBLICATIONS

Rai, et al., (2010), CMAS-Resistant Thermal Barrier Coatings (TBC). International Journal of Applied Ceramic Technology, 7: 662-674. doi:10.1111/j.1744-7402.2009.02373.
(Continued)

*Primary Examiner* — Maria V Ewald
*Assistant Examiner* — Ethan Weydemeyer
(74) *Attorney, Agent, or Firm* — Dority & Manning, P.A.

(57) ABSTRACT

Methods for preparing slotted ceramic coatings and the resulting components comprising the same are provided. The methods and products include the incorporation of a coating system comprising a ceramic coating with cooling holes disposed throughout the ceramic coating and slots defined in the thermal barrier coating and disposed in relation to the cooling holes. The resulting ceramic coating has improved resistance to CMAS infiltration and improved compliance resulting in an increased life of the coated component.

20 Claims, 9 Drawing Sheets

(51) Int. Cl.
*F01D 9/02* (2006.01)
*F01D 25/08* (2006.01)
*F23R 3/00* (2006.01)
*F01D 5/18* (2006.01)
*F01D 25/12* (2006.01)
*B23K 26/364* (2014.01)
*C04B 35/505* (2006.01)
*F23M 5/02* (2006.01)

(52) U.S. Cl.
CPC .............. *F01D 5/18* (2013.01); *F01D 5/186* (2013.01); *F01D 9/02* (2013.01); *F01D 25/08* (2013.01); *F01D 25/12* (2013.01); *F23M 5/02* (2013.01); *F23R 3/002* (2013.01); *F23R 3/007* (2013.01); *C04B 2235/3244* (2013.01); *C04B 2235/3246* (2013.01); *F05D 2220/32* (2013.01); *F05D 2230/13* (2013.01); *F05D 2230/90* (2013.01); *F05D 2240/11* (2013.01); *F05D 2250/294* (2013.01); *F05D 2260/202* (2013.01); *F05D 2260/607* (2013.01); *F05D 2300/6033* (2013.01); *F23M 2900/05003* (2013.01); *F23M 2900/05004* (2013.01); *F23R 2900/00018* (2013.01); *F23R 2900/03042* (2013.01)

(58) Field of Classification Search
CPC . F01D 25/08; F01D 25/12; F23M 5/02; F23R 3/002; F23R 3/007
USPC .................................................. 428/131–155
See application file for complete search history.

(56) References Cited

U.S. PATENT DOCUMENTS

| | | | |
|---|---|---|---|
| 5,419,971 A | 5/1995 | Skelly et al. | |
| 5,558,922 A | 9/1996 | Gupta et al. | |
| 5,681,616 A | 10/1997 | Gupta et al. | |
| 6,010,746 A | 1/2000 | Descoteaux et al. | |
| 6,316,078 B1 | 11/2001 | Smialek | |
| 6,339,879 B1* | 1/2002 | Wheat | B21D 53/78 |
| | | | 29/889.7 |
| 6,511,762 B1 | 1/2003 | Lee et al. | |
| 6,703,137 B2 | 3/2004 | Subramanian | |
| 7,704,596 B2* | 4/2010 | Merrill | B32B 3/266 |
| | | | 428/293.4 |
| 8,356,482 B2 | 1/2013 | Duval et al. | |
| 8,357,454 B2 | 1/2013 | Kulkarni et al. | |
| 8,470,460 B2 | 6/2013 | Lee | |
| 8,852,720 B2 | 10/2014 | Bolcavage et al. | |
| 9,194,243 B2 | 11/2015 | Bolcavage et al. | |
| 2003/0044624 A1* | 3/2003 | Spitsberg | C23C 28/3455 |
| | | | 427/248.1 |
| 2003/0221315 A1 | 12/2003 | Baumann et al. | |
| 2009/0169752 A1 | 7/2009 | Fu et al. | |
| 2009/0252985 A1 | 10/2009 | Nagaraj et al. | |
| 2010/0028128 A1* | 2/2010 | Fischer | F01D 25/12 |
| | | | 415/1 |
| 2012/0317984 A1 | 12/2012 | Dierberger | |
| 2016/0347671 A1 | 12/2016 | Strock | |

OTHER PUBLICATIONS

Bilge et al., CMAS-Resistant Plasma Sprayed Thermal Barrier Coatings Based on Y2O3-Stabilized ZrO2 with Al3+ and Ti4+ Solute Additions, Journal of Thermal Spray Technology, vol. 23 Issue: 4, Apr. 2014, p. 708-715.

Wu et al., Evaluation of Plasma Sprayed YSZ thermal Barner Coatings with the CMAS Deposits Infiltration using Impedance Spectroscopy, Progress in Natural Science: Materials International, vol. 22 Issue: 1, Feb. 2012, pp. 40-47.

\* cited by examiner

SLOTTED CERAMIC COATINGS FOR IMPROVED CMAS RESISTANCE AND METHODS OF FORMING THE SAME

FIELD

Embodiments of the present invention generally relate to ceramic coatings (e.g., thermal barrier coatings and environmental barrier coatings) for components of turbomachinery, such as gas turbine engines.

BACKGROUND

Thermal barrier coatings (TBCs) are generally needed for most recent high-performance gas turbine engines. The efficiency of a combustion turbine engine improves as the firing temperature of the combustion gas is increased. As the firing temperatures increase, improved high temperature durability of the turbine components is needed. Nickel and cobalt based superalloy materials are now used extensively for components in the hot gas flow path such as combustor liners and combustor transition pieces, and turbine rotating and stationary blades (directionally solidified and single crystal). However, even these most recent superalloys are not capable of surviving long-term operation at temperatures which can sometimes exceed 1,400° C. In many applications, a metal substrate is coated with a TBC ceramic insulating material in order to reduce the service temperature of the underlying metallic segments of the components.

The strain tolerance of TBCs used in gas turbine engines is increased by the use of through-thickness pores and cracks within the TBC produced by air plasma spray (APS) methods and the use of columnar TBCs produced by electron beam physical vapor deposition (EBPVD) methods. However, environmental dust, such as dust containing some combination of calcium-magnesium-alumino-silicate (CMAS), is often ingested into the hot sections of gas turbine engines. The dust can deposit on components in the engine and, due to the high surrounding temperatures, can become molten. The resulting low-viscosity liquid infiltrates into the engineered pores and/or columns of the thermal barrier coating (TBC) on the component that protects the metal substrate. Once the liquid CMAS solidifies upon cooling, the compliance of the TBC and the strain tolerance capability of the coating decreases dramatically. Coating features needed for strain tolerance are filled by the solidified CMAS.

Further, with CMAS infiltration, the stresses that are generated in the TBC can cause early spallation of the coating. Spallation of the TBC creates hot spots in the metal substrate leading to reduction in component life. The spallation in turn leads to unscheduled maintenance as well as parts replacement resulting in increased operating costs and increased servicing costs.

Gas temperatures in the high pressure turbine section of gas turbine engines have increased in recent years, and as a result the ceramic TBCs become increasingly vulnerable to attack by molten CMAS deposits resulting from the ingestion of siliceous particulates (e.g., dust, sand, volcanic ash, debris) with the intake of air. Even when particle removal strategies are utilized, small diameter particles are still able to reach the turbine section, where they melt, and infiltrate through its interconnected network of inter-columnar pores.

Thus, an improved design of a TBC coated metal component, particularly a component for gas turbine engines, is desirable in the art.

BRIEF DESCRIPTION

Aspects and advantages of the invention will be set forth in part in the following description, or may be obvious from the description, or may be learned through practice of the invention.

Coated components are generally provided, along with methods of forming such coated components. In one embodiment, the coated component includes a substrate defining a surface and a ceramic coating disposed along the surface of the substrate. The ceramic coating may include one or more cooling holes disposed in the ceramic coating and a plurality of slots disposed in the ceramic coating forming segments of ceramic coating material, with the slots being disposed relative to the one or more cooling holes such that the slots do not pass through any of the one or more cooling holes. Individual slots in the plurality of slots may have a width of about 10 microns to 200 microns and/or a depth of about 50 microns to about 1000 microns, depending on thickness of coating. In certain embodiments, each individual slot in the plurality of slots may be spaced apart from another slot by about 0.25 mm to about 3 mm. Such a coated component may be utilized as a component of a gas turbine assembly.

In one embodiment, a method is provided for forming a coated component by forming a ceramic coating along a surface of a substrate with the ceramic coating comprising one or more cooling holes disposed in the ceramic coating. A plurality of slots may be formed along the ceramic coating relative to the one or more cooling holes such that the plurality of slots do not pass through any of the one or more cooling holes such that the plurality of slots form segments of ceramic coating material.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In the present disclosure, when a layer is being described as "on" or "over" another layer or substrate, it is to be understood that the layers can either be directly contacting each other or have another layer or feature between the layers, unless expressly stated to the contrary. Thus, these terms are simply describing the relative position of the layers to each other and do not necessarily mean "on top of" since the relative position above or below depends upon the orientation of the device to the viewer.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

An improved ceramic coating is generally provided with local slotting for improved coating durability. The improved ceramic coating has an improved balance of thermal strain tolerance, environmental resistance, and heat transfer performance in the distress zones of components, such as combustors, airfoils, heat shields, etc. The coating has improved environmental resistance, particularly to CMAS. The molten dust that forms during operation of the turbine engine at high operating temperatures typically includes some combination of $CaO$—$MgO$—$Al_2O_3$—$SiO_2$, commonly known as CMAS; small amounts of other oxides are often present in the molten composition as well, as is understood in the art. The present coating includes local and tailored slotting into the ceramic coating that creates segments of ceramic coating material. Thus, the ceramic coating material is segmented to provide a balance of CMAS resistance and heat transfer resistance. The approach can be applied to a variety of components, such as combustors, blades, nozzles, heat shields, etc.

For example, the ceramic coating may be a thermal barrier coating (TBC) such as used on a metallic components, including metal alloy components and superalloy components. Alternatively, the ceramic coating may be an environmental barrier coating (EBC) such as used on a ceramic matrix composite (CMC) components. One particularly suitable TBC material includes, for example, yttria-stabilized zirconia (YSZ), but is not limited to any particular ceramic. Particularly suitable EBC materials include, for example, silicates and aluminosilicates, but is not limited to any particular ceramic. Although the following description references TBCs, it is understood that these teaches apply to both TBCs and EBCs and is not intended to limit this description to TBCs.

Figure 1:
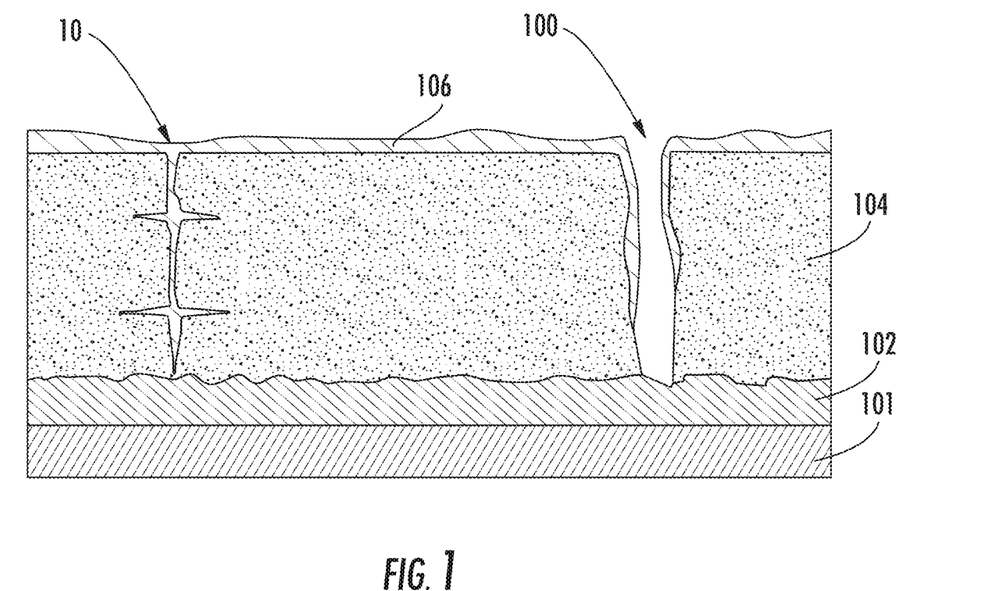
FIG. 1 shows a comparison of a conventional crack formed in a TBC and a slot formed in the TBC in accordance with one embodiment of the present disclosure.

FIG. 1 illustrates a conventional crack 10 formed in a coating compared to a coating including a slot 100 formed in the TBC material in accordance with one embodiment of the present disclosure. FIG. 1 is a cross section and includes a bond coat 102, a thermal barrier coating (TBC) 104, and a layer of CMAS 106. FIG. 1 also includes a conventional crack 10 and the present slot 100. As shown in FIG. 1, the conventional crack 10 is completely filled by the molten CMAS 106, reducing the strain tolerance of the coating. In comparison, due to the configuration of the slot 100, the CMAS 106 does not completely fill the slot 100. The molten CMAS 106 can infiltrate into the slot 100, however, due at least in part to the geometry and width of the slot 100, the CMAS cannot bridge the slot 100. The configuration of the slot 100 reduces capillary forces that may pull CMAS into the slot, and possibly below the melting isotherm. Low in-plane modulus is maintained and in-plane compliance of the TBC in the plane perpendicular to the slot 100 may be retained. The slot 100 may also prevent or delay large area spallation by acting as "crack-stoppers" preventing the formation of delamination cracks.

Figure 2:
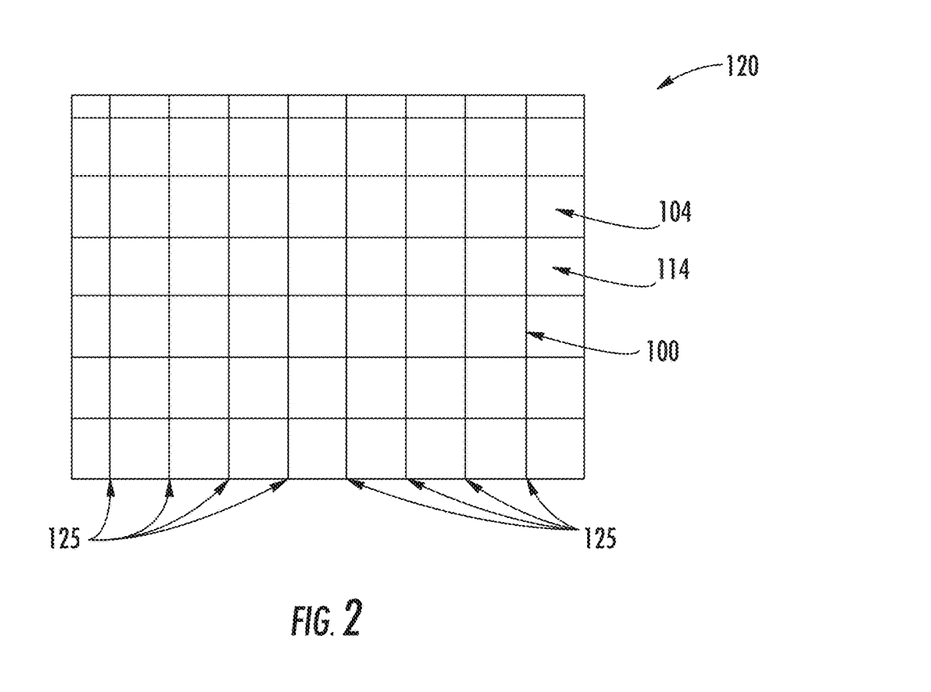
FIG. 2 illustrates a plan view of a plurality of slots in a coating in accordance with one embodiment of the present disclosure.

FIG. 2 illustrates a plurality of slots 100 formed in a TBC 104. In particular, FIG. 2 shows a TBC coated substrate with a plurality of slots 100 disposed in the TBC 104. In one embodiment, the slots may be disposed in any pattern, without regard for the location of the cooling holes or other features in the substrate. In the exemplary embodiment of FIG. 2, the plurality of slots 100 are disposed in a grid pattern forming segments 114 of TBC material on the surface of the substrate, with the slots 100 being disposed in nominally parallel and perpendicular directions (approximately 0°/90° angles).

Figure 3:
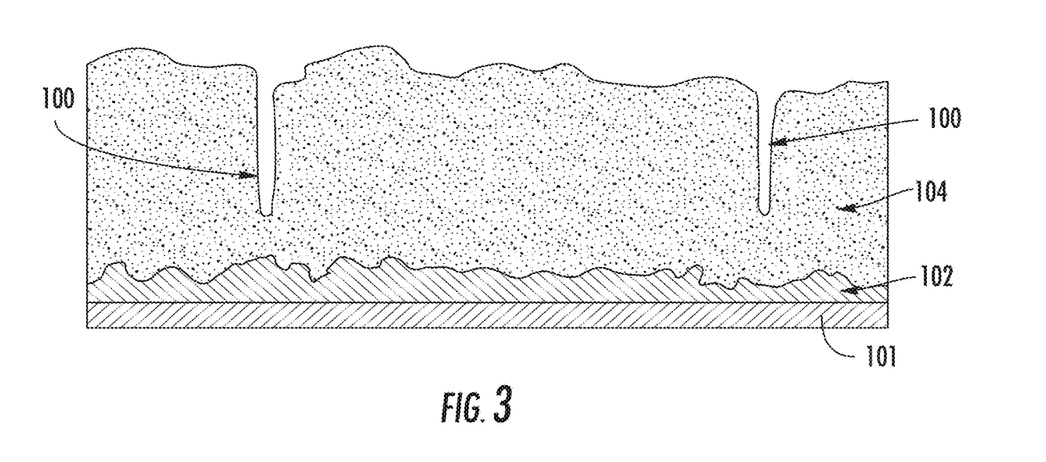
FIG. 3 is a cross section of a coating in accordance with one embodiment of the present disclosure.

FIG. 3 also illustrates the formation of slots 100 in the coating 120. FIG. 3 is a cross section of a coating 120 comprising a bond coat 102, a TBC 104, and slots 100 formed in the TBC 104. In particular, in the embodiment illustrated in FIG. 3, the coating 120 includes a bond coat 102 and a TBC 104 where the TBC includes a single layer of TBC material. However, in other embodiments, multiple layers may be utilized to form the TBC 104. The slots 100 may traverse the one or more layers of TBC material. The TBC 104 may have a total thickness of about 100 microns to about 2500 microns, such as about 350 microns to about 700 microns.

As shown, a plurality of slots 100 are formed throughout the coating 120 in the TBC 104. The coating 120 is disposed along a substrate 101 of the component. In the embodiment illustrated in FIG. 3, the slots 100 do not extend to the bond coat 102. Without wishing to be bound by any particular theory, it is believed that extending the slots 100 into the bond coat 102 may, under some circumstances, detract from component life. Thus, in particular embodiments, the slots 100 may extend through the ceramic material of the TBC 104 (either partially or fully).

In particular embodiments, the slots 100 extend through about 40% to about 85% of the total thickness of the TBC 104, such as about 50% to about 85%. For example, if the total TBC thickness is about 610 μm (about 24 mils) to about 660 μm (about 26 mils), the slot depth can be about 380 μm (about 15 mils) to about 510 μm (about 20 mils). In another example, if the total TBC thickness is about 355 μm (about 14 mils) to about 406 μm (about 16 mils), the slot depth can be about 254 μm (about 10 mils) to about 305 μm (about 12 mils).

The width of the slots 100 may be designed to be sufficiently large to maintain desirably low capillary forces and to reduce risk of bridging of the slots with molten material, but small enough to not substantially affect the performance of the TBC 104. For example, the slots 100 may be about 10 μm to about 200 μm wide, such as about 10 μm to about 100 μm wide, about 15 μm to about 90 μm wide, or about 20 μm to about 80 μm wide. For instance, the slots 100 may be about 25 μm wide to about 75 μm wide to provide improved resistance to complete CMAS infiltration. Additionally, the slots 100 may have a depth sufficient to allow particles to deposit therein, but not reach the underlying substrate. For example, the slots 100 may have a depth of about 50 μm to about 1000 μm, such as about 100 μm to about 800 μm, or about 200 μm to about 700 μm. The aspect ratio (depth to width) of the slots 100 may be about 2 to about 50, such as about 3 to about 10, or about 5 to about 10. The slots 100 may be spaced about 0.25 mm to about 3 mm apart, such as about 0.5 mm to about 2 mm apart, or about 0.5 mm to about 1.5 mm apart. For instance, the slots 100 may be spaced about 1 mm apart. During operation of aircraft engines in environments that contain fine-scale dust, such as measured by the PM10 level, the dust can accumulate in the fine scale cooling holes and reduce the cooling efficiency. The axial slots 100 may provide cross flow in or near the slot. Without wishing to be bound by any particular theory, it is believed that the axial slots 100 may thereby preventing dust deposition.

Although shown as being substantially perpendicular to the outer surface of the TBC (i.e., about 90°), the slots 100 may be formed at another angle with respect to the TBC's surface into the thickness of the TBC, such as about 60° to about 90°.

The slots 100 may be produced by cutting with a high-speed saw, a laser system, abrasive water jet, or combinations thereof.

Various geometries of the slots 100 are available. In one embodiment, the slots 100 are parallel sided notches with an aspect ratio (depth/width) greater than 4 (e.g., about 4 to about 10). In another embodiment, the slots 100 may be of a V-shaped and/or U-shaped profile. It should be understood that the terms V-shaped and U-shaped describe the general geometry of the slots 100, while allowing for variations within the actual shape so as to not be a perfect V or U shape, respectively. The V-shape and/or U-shape may reduce the rate at which the closure of the slot 100 may occur due to CMAS build up on the sides of the slot 100 during operation.

A plurality of slots 100 may form an array 125 of slots 100 traversing the TBC 104 in the coating 120. Each slot 100 may extend for the length of the surface of the coating 120 (i.e., the entire length of the surface). In most embodiments, each slot 100 has a length of that is about 1 cm or longer (e.g., 1 cm to the end of the surface of the coating 120).

As used herein, "TBC" or "TBCs" is used to refer to stabilized ceramics that can sustain a fairly high temperature gradient such that the coated metallic components can be operated at gas temperatures higher than the metal's melting point. For instance, the TBC material may be one or more of yttria stabilized zirconia (YSZ) and other rare-earth-stabilized zirconia compositions, mullite ($3Al_2O_3$-$2SiO_2$), alumina ($Al_2O_3$), ceria ($CeO_2$), rare-earth zirconates (e.g., $La_2Zr_2O_7$), rare-earth oxides (e.g., $La_2O_3$, $Nb_2O_5$, $Pr_2O_3$, $CeO_2$), and metal-glass composites, and combinations thereof (e.g., alumina and YSZ or ceria and YSZ). Besides its high temperature stability, YSZ also has a good combination of high toughness and chemical inertness, and the thermal expansion coefficient of YSZ is a comparatively suitable match to that of the metallic components of the turbine blade being coated.

The TBC 104 may be formed by any suitable process. For instance, one or more TBCs 104 may be formed by air-plasma spray (APS), electron beam physical vapor deposition (EBPVD), high velocity oxygen fuel (HVOF), electrostatic spray assisted vapor deposition (ESAVD), and direct vapor deposition. APS may allow for higher deposition rates and better coverage of the surface than EBPVD. However, the porous and lamellar nature of the sprayed coating from APS may limit the performance and life of the coating. TBCs 104 fabricated via EBPVD may withstand high thermo-mechanical stresses due to the columnar structures of the layer, resulting in a strain tolerant coating. For application in a turbine, a TBC should be strongly bonded to the surface for multiple thermal cycles.

The bond coat 102 may be any suitable bond coat 102 for improving the adherence of the TBC 104 to the underlying substrate 101 and may be generally uniform underneath the TBC 104. For instance, in some embodiments, a platinum modified nickel aluminide bond coat 102 may be formed on the substrate 101 and then a TBC 104 may be applied to the platinum modified nickel aluminide bond coat 102. Without intending to be limiting, the bond coat 102 may help prevent or reduce oxidation of the substrate 101, thereby also reducing spallation.

The substrate 101 may be any suitable material such as a metal such as steel or superalloys (e.g., nickel-based superalloys, cobalt-based superalloys, or iron-based superalloys, such as Rene N5, N500, N4, N2, IN718, Hastelloy X, or Haynes 188) or other suitable materials for withstanding high temperatures. The TBC 104 may be disposed along one or more portions of the substrate 101 or disposed substantially over the whole exterior of the substrate 101.

The slots 100 are generally disposed locally on components to provide additional compliance and strain tolerance to prevent TBC spallation. Typically, the slots 100 are positioned between cooling holes, if present, and may provide additional compliance and strain tolerance. Without intending to be bound by theory, the slots 100 can improve resistance to CMAS attack and increase component life.

As stated above, the TBC 104 is slotted to provide a balance of CMAS resistance and heat transfer resistance. Additionally, the slots 100 locally address regions of a component, for example a combustor, that are known to operate at high temperature and suffer spalling distress by CMAS fusion and infiltration. The slots 100 in the TBC 104 can be tailored to address the specific level of CMAS resistance that is required in the areas of concern. For example, deeper slots 100 can be used in regions of the TBC 104 where the TBC 104 may experience the hottest temperatures. Slots 100 between cooling holes provide extra compliance and strain tolerance. Even though the region between the cooling holes may run hotter and the TBC 104 in this area may be prone to CMAS spallation degradation, the extra compliance due to the slot 100 may prevent CMAS spallation and extend component life. The TBC can include one or more layers, and the orientation of the slots with respect to the diffusion of cooling air from the cooling holes may be controlled in this regard.

Figure 4:
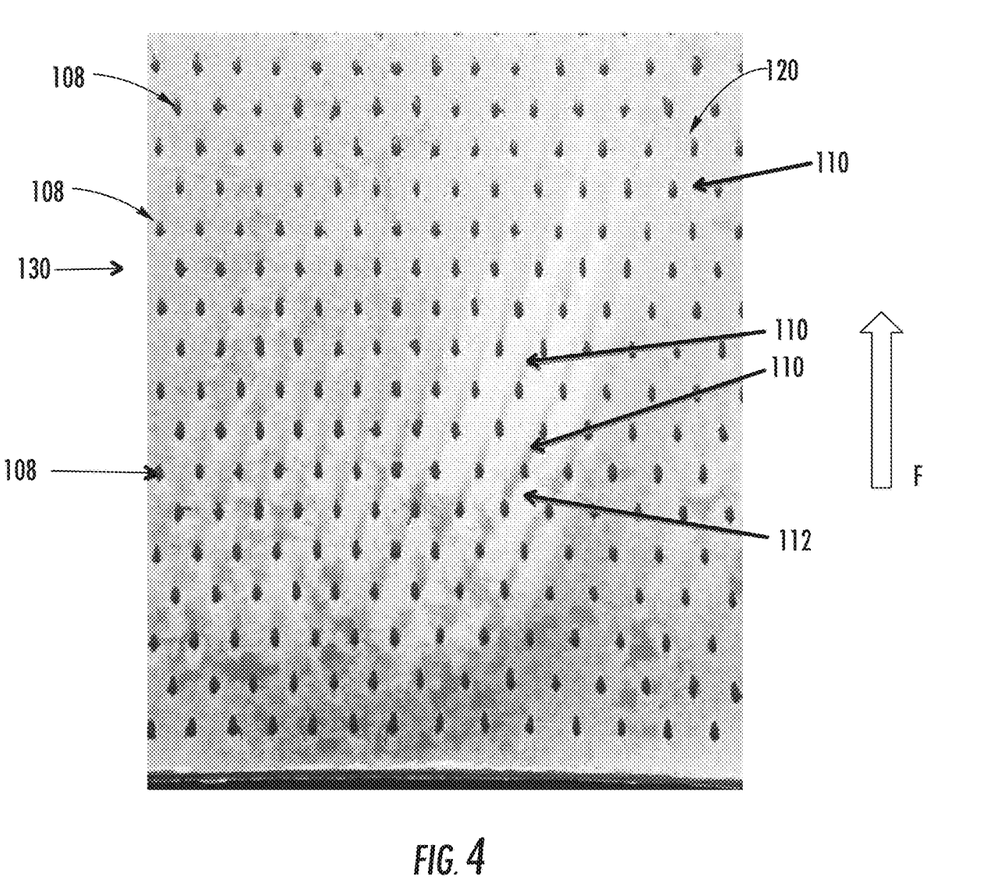
FIG. 4 illustrates a portion of a combustor liner of a gas turbine engine.

In particular, the slots 100 may be positioned locally in regions of high distress. For instance, certain areas of a component may be exposed to higher temperatures than surrounding areas. At these locations, the CMAS is more likely to melt and infiltrate cracks in the TBC 104. FIG. 4 illustrates a portion of a combustor liner 130 relative to the direction of engine flow (F). The combustor liner 130 includes cooling holes 108 disposed throughout the TBC 104. Cooling holes 108 are generally cylindrical elongate bodies formed in the combustion liner 130 and in the coating 120 to provide film cooling and extend from one side of the component through to the opposite side of the component. As used herein, "elongate" refers to an aspect ratio (length/width) of greater than 1. The size, spacing, and angle of the cooling holes may vary depending on the component in which they are used.

The combustor liner 130 also includes areas where CMAS has accumulated as dust on the combustor liner. These areas are low distress regions 110 and are generally exposed to lower temperatures than the high distress regions 112. The high distress regions 112 are generally exposed to higher operating temperatures and, thus, accumulated CMAS melts, infiltrating surrounding cracks. As shown in FIG. 4, the regions of high distress 112 are generally between cooling holes 108, whereas cooler areas are found in-line with the cooling holes 108 in the direction of the air flow (F). The high distress regions 112 may be exposed to temperatures about 5% higher than the temperatures to which the surrounding regions of the TBC are exposed. For instance, in some embodiments, the high distress regions 112 may be exposed to temperatures about 10% higher, or about 15% higher than temperatures to which the surrounding regions of the TBC are exposed, such as the low distress regions 110.

Figure 5:
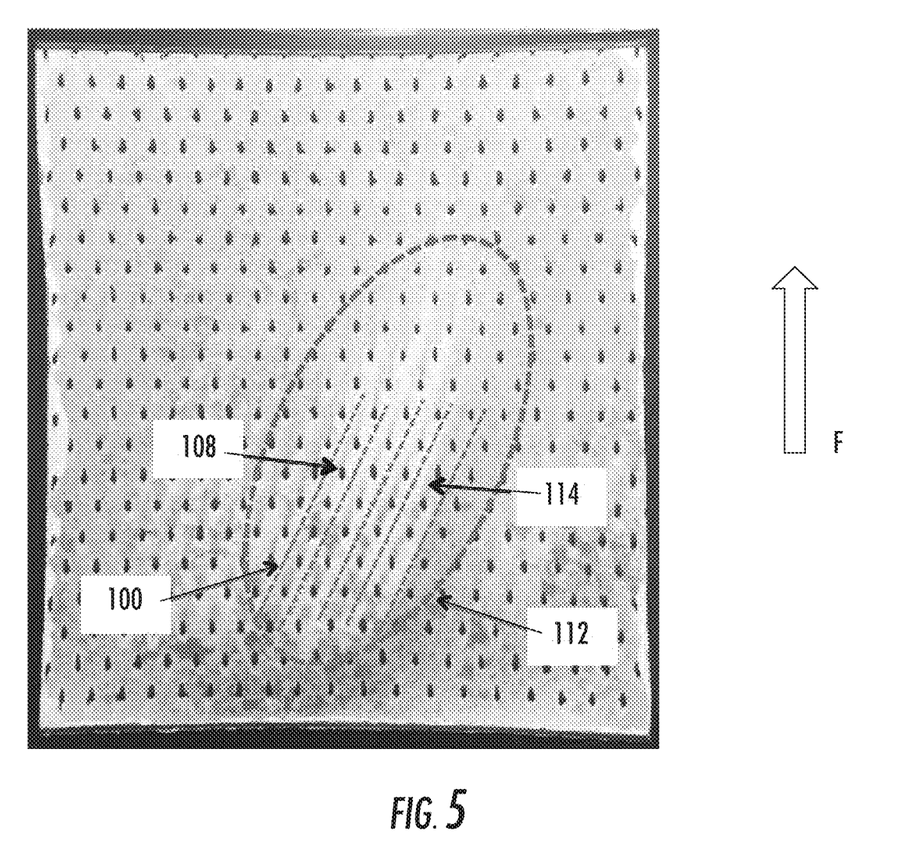
FIG. 5 illustrates a portion of a combustor liner of a gas turbine engine with a plurality of slots in accordance with one embodiment of the present disclosure.
Figure 6:
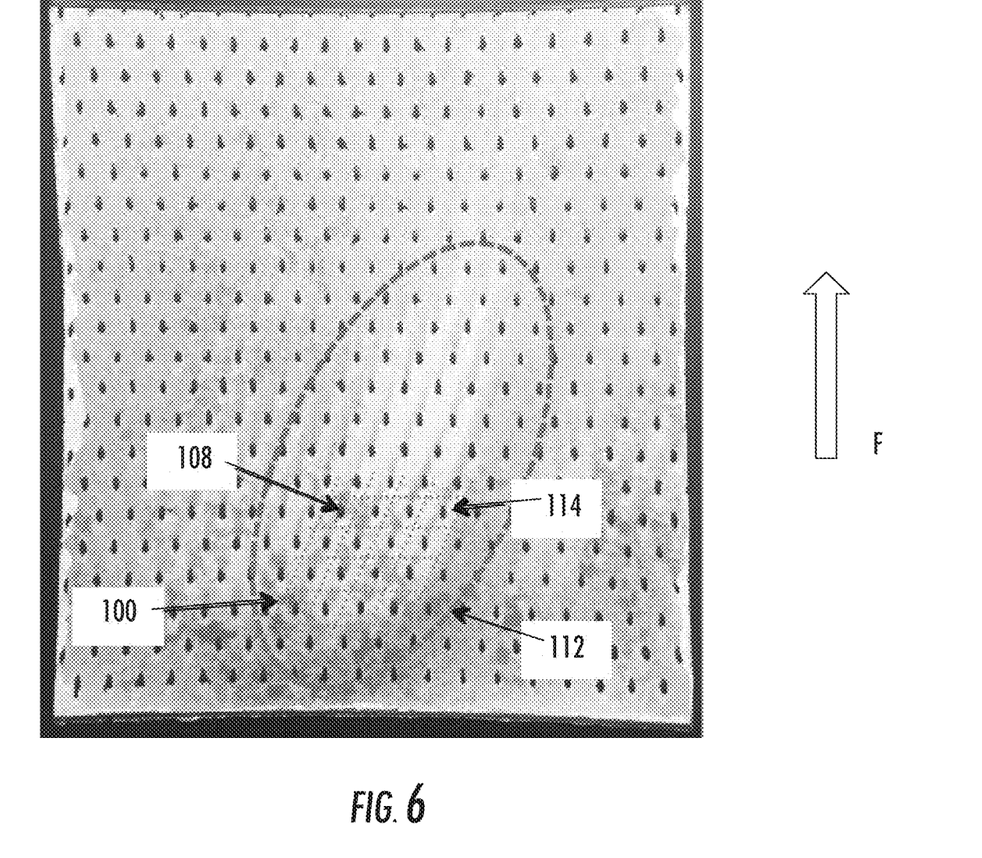
FIG. 6 illustrates a portion of a combustor liner of a gas turbine engine with a plurality of slots in accordance with one embodiment of the present disclosure.

The slots 100 may be positioned between cooling holes 108 in the high distress regions 112. As shown in FIG. 5, a plurality of slots 100 may be disposed between adjacent cooling holes 108 in the high distress regions 112. In the embodiment illustrated in FIG. 5, the plurality of slots 100 are disposed in a direction 30° of the direction of the engine flow path. The plurality of slots 100 form segments 114 of TBC bounded by the slots 100. FIG. 6 illustrates another embodiment of the present coating 120 where the plurality of slots 100 are disposed between adjacent cooling holes 108 in the high distress region 112 in both a direction about 30° of the direction of the engine flow path and a direction perpendicular to the engine flow path. Even though shown at 30° from the direction of engine flow, the slots 100 may be angled as desired with respect to the engine flow path, such as from about 10° to about 90°. In this embodiment, the plurality of slots 100 form a grid pattern of slots in the TBC 104. As in FIG. 5, the plurality of slots 100 in FIG. 6 form segments 114 of TBC material bounded by the slots 100.

Figure 7:
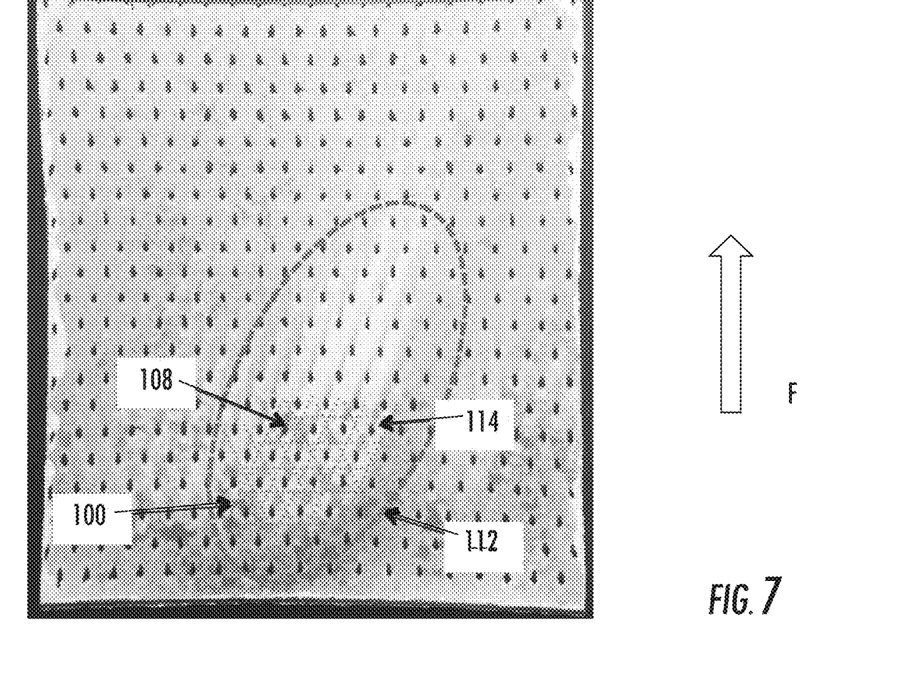
FIG. 7 illustrates a portion of a combustor liner of a gas turbine engine with a plurality of slots in accordance with one embodiment of the present disclosure.

FIG. 7 illustrates a further embodiment of the present coating 120 comprising a plurality of slots 100 disposed between adjacent cooling holes 108 in the high distress region 112. The plurality of slots 100 are disposed in a direction 30° of the direction of the engine flow path, in a direction perpendicular to the engine flow path, and in a direction 150° from the direction of the engine flow path. As evident from the embodiments illustrated in FIGS. 5 to 7, the plurality of slots 100 may be disposed in a variety of directions, forming segments of TBC material 114, so long as the plurality of slots 100 are disposed between cooling holes 108 and do not traverse through a cooling hole 108. The number of slots 100 and the direction of the slots 100 may be varied to manage thermal strain and CMAS deposition/infiltration.

Figure 8A:
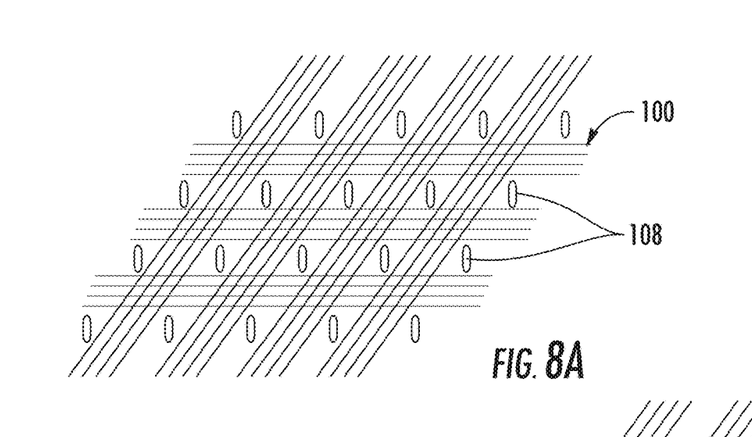
FIG. 8a illustrates the placement of a plurality of slots in accordance with one embodiment of the present disclosure.
Figure 8B:
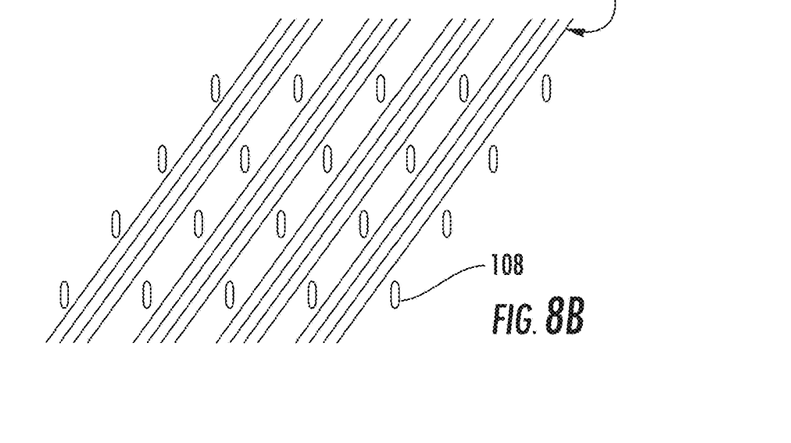
FIG. 8b illustrates the placement of a plurality of slots in accordance with one embodiment of the present disclosure.

FIGS. 8A and 8B schematically illustrate the positioning of the slots 100 in relation to the cooling holes 108 in some embodiments of the present disclosure. As shown, the slots 100 are formed in parallel arrays oriented in a manner that passes between and around the cooling holes 108 without traversing through the cooling holes 108. In certain embodiments, shorter slots may extend from one cooling holes 108 toward adjacently positioned cooling hole 108 without traversing either cooling hole 108. Such shorter slots may be included in either embodiment shown in FIG. 8A or 8B, and any other pattern of slots 100.

When the slots 100 traverse through cooling holes 108, the slots 100 may be formed by laser cutting into the TBC 104 or the substrate surface at the cooling hole, which may interfere with the configuration of the cooling holes 108 and/or the film cooling provided by the cooling holes 108. Thus, in particular embodiments, the plurality of slots 100 are disposed relative to the one or more cooling holes 108 such that the plurality of slots 100 do not pass through any of the one or more cooling holes 108. It is to be understood that the slots 100 may be substantially tangent to the cooling holes 108 (e.g., allowing for a slight touching of the slot 100 to the cooling hole 108). For example, a slot 100 may encroach into the region of a cooling hole 108 up until the slot 100 would cut below the bond coat 102, while still being categorized as "not passing through" a cooling hole 108.

In the embodiments shown, the slots 100 are substantially continuous across the surface of the TBC 104. However, in other embodiments, the slots 100 may be discontinuous so as to bypass an area of the ceramic coating and/or a cooling hole 108. For example, one or more short slots may be disposed between two adjacent cooling holes.

Figure 9:
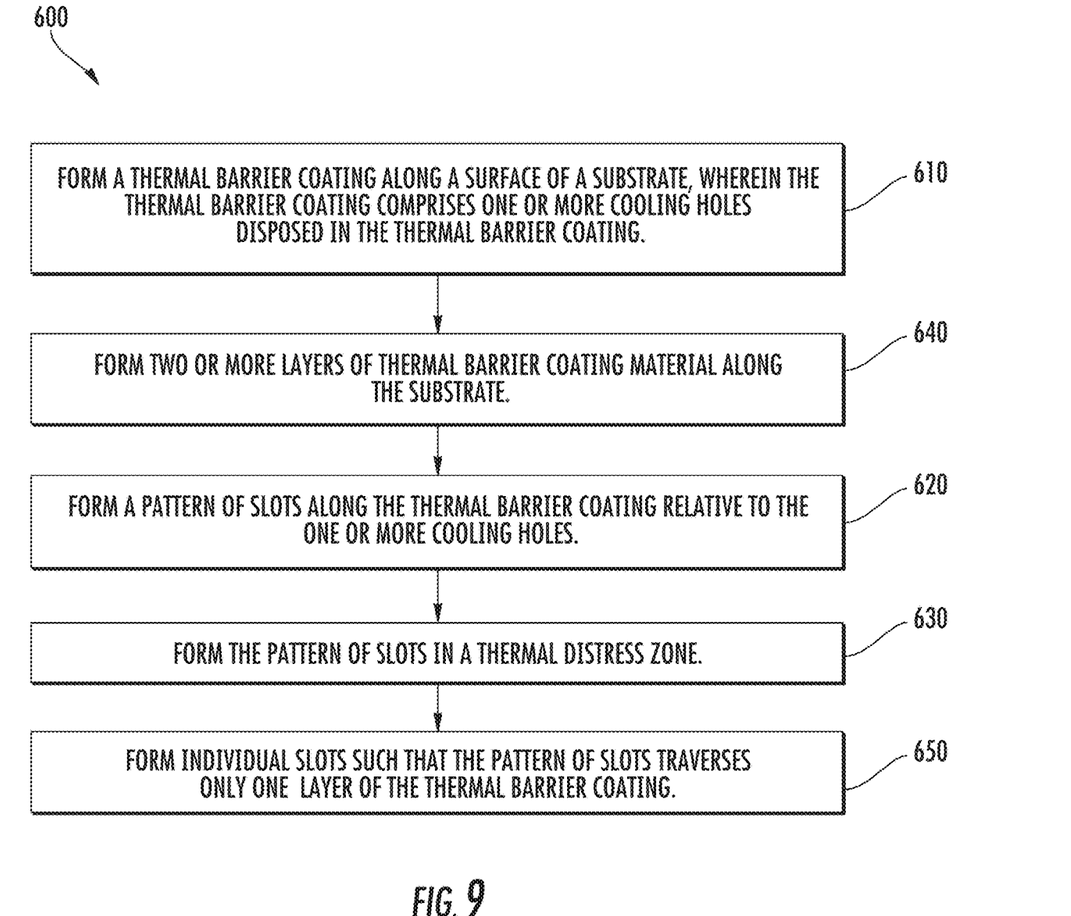
FIG. 9 is a flowchart of a method of forming a coating in accordance with one embodiment of the present disclosure.

FIG. 9 is a flowchart of a method of forming a slotted thermal barrier coating in accordance with one embodiment of the present disclosure. The method 600 includes forming a thermal barrier coating along a surface of a substrate 610, wherein the thermal barrier coating comprises one or more cooling holes disposed in the thermal barrier coating, and forming a plurality of slots along the thermal barrier coating relative to the one or more cooling holes 620 such that the plurality of slots do not pass through any of the one or more cooling holes, wherein the plurality of slots form segments of thermal barrier coating material. In some embodiments, forming the plurality of slots along the thermal barrier coating 620 may comprise forming the plurality of slots in a thermal distress zone 630, the thermal distress zone being a zone configured to be exposed to temperatures of about 5% or higher (e.g., about 10% or higher) than another zone of the thermal barrier coating during operation of the component. In some embodiments, forming the plurality of slots along the thermal barrier coating 620 may comprise laser-cutting, high speed mechanical saw, or combinations thereof and may include forming individual slots with an aspect ratio of about 5 or more. In some embodiments, forming the plurality of slots along the thermal barrier coating 620 may comprise forming individual slots with a width of about 10 microns to 100 microns and a depth of about 50 microns to about 1000 microns, depending on the thickness of the ceramic coating. In some embodiments, forming the plurality of slots along the thermal barrier coating 620 may comprise forming a plurality of individual slots, each individual slot in the plurality of slots being spaced apart from another slot by about 0.25 mm to about 3 mm.

In some embodiments, forming a thermal barrier coating 610 may comprise forming two or more layers of thermal barrier coating material along the substrate 640 and forming the plurality of slots along the thermal barrier coating 620 may comprise forming individual slots such that the plurality of slots traverses only one layer of the thermal barrier coating material 650.

The resulting coating has an improved life in aggressive environments, such as those with high concentrations of airborne particulates, including dust, sand, etc. Components can experience the build-up of molten dust deposits that contain calcium oxide, magnesium oxide, alumina, and silica, generally known as CMAS. The environmental dust may be characterized by various parameters, such as the "PM10 level" (particulate matter less than 10 microns). In such environments, the prior TBCs can become compromised and spall as a result of CMAS degradation. The present coating has an improved combination of CMAS resistance, strain tolerance, and thermal resistance. The present coating includes slots proximate to the film cooling holes, such as in a component of a turbine engine. The slots can improve the resistance to CMAS attack and increase component life. The geometry of the slots, the width, and the spacing of the slots may be modified to achieve the desired coating.

The slots may provide mechanical compliance and strain tolerance to prevent TBC spallation, such as in components that experience cycling in high temperature environments. Due to strain mismatch between TBC materials and a metal substrate on cycling at very high temperatures, coatings need compliance in order to prevent cracking, buckling, and spallation during thermal cycling. The compliance has previously been provided by microstructure engineering (using pores, cracks, columnar microstructures, etc.). However, such compliance can be reduced when turbines are operated in environments where there are high dust levels, because the dust fuses and infiltrates into the TBC, reducing the compliance that has been introduced by the microstructure engineering. The slots in the present coating prevent or reduce the decrease in TBC performance due to CMAS infiltration. The slots have an additional advantage in terms of their ability to tolerate molten CMAS, as has been demonstrated and observed in test coupons after testing in cycling CMAS exposure conditions.

While the present disclosure discusses combustor liners, the principle of the coating to improve mechanical compliance and strain tolerance can be applied anywhere involving high temperature environments exposed to dust and particulates (e.g., high pressure turbines (HPT), low pressure turbines (LPT), high pressure compressor (HPC), low pressure compressor (LPC)). The coating system is particularly suitable for use in gas turbine engines, for example, combustor components (e.g., combustor liners), blades (including turbine and combustion airfoils), shrouds, nozzles, heat shields, and vanes.

EXAMPLES

Differentiating Porous APS TBC & DVM-TBC:

A coating was formed to include a plurality of slots formed therein. The coating was tested with a range of TBC coatings on nickel-based super-alloy coupons. The slots were machined in the TBC to produce TBC segments, or a segmented TBC structure. A single layer TBC was tested, with the single layer TBC formed of an air plasma sprayed porous "8YSZ" TBC, which refers to the yttria stabilized zirconia composition of zirconia with 8 wt % yttrium oxide. The TBC thickness on the single layer APS coating that was tested was nominally 0.38 mm (15 mils) thick.

The two-layer TBC is described as a dense vertically microcracked TBC (DVM-TBC). In the DVM-TBC, the first or base layer was 8YSZ and the second layer had a higher concentration of yttria stabilized zirconia (YSZ). In the present example, a TBC was formed with a second layer of about 55YSZ (55 wt % $Y_2O_3$ in 45% $ZrO_2$). The total TBC thickness on the two-layer DVM is nominally 0.64 mm (25 mils) thick. The base 8YSZ layer is about 0.38 mm (i.e., about 15 mils) thick and the top layer is about 0.25 mm (i.e., about 10 mils) thick.

TBC Slotting Methods:

A range of slotting approaches were considered based on the slot geometry that was required, the reproducibility of the manufacturing method, the speed of producing the slots, and the cost of producing the slots, and the component application performance requirements. It is preferable to use a cost effective scalable method to slot TBCs, because of the number of segments that are potentially required in large parts. In the present example, several methods were utilized to slot TBCs, where some methods are more easily scalable than others. For example, methods may include (a) diamond saw cutting, (b) picosecond laser slotting, and (c) nanosecond laser slotting. Other methods can also be used. The maximum slot depth that is preferred is up to approximately 80% of the total TBC thickness. For example, on the APS porous 8YSZ TBC, the maximum slot depth is about 0.30 mm (i.e., about 12 mils) and for the two-layer DVM 55YSZ, the maximum slot depth is about 0.50 mm (i.e., about 20 mils). Laser slotting is the preferred cost-effective scalable method to slot turbine components. Laser slotting is compatible with most aerospace manufacturing processes and quality requirements.

Testing Slotted and Unslotted Coupons to Demonstrate Benefit:

The coupons were tested using two different methods to simulate the engine operating environment. The first test is the Jet Engine Thermal Shock (JETS) test, and the second test is Furnace cycle testing (FCT); both of these tests are described in more detail below:

Jet engine thermal shock (JETS) test: The slotted coupons were tested to evaluate their ability to withstand multiple thermal shocks at temperatures in the presence of atmospheric dust as represented by a standard CMAS dust, as described in more detail below. The JETS test employs a high temperature gradient across the thickness of the test coupon. The temperature gradients employed are like those that components experience in an engine. The thermal shock testing in the presence of dust simulates the thermal cycling and environmental dust exposure that components experience in the turbine section of aircraft turbomachinery in general operation. For the purposes of this description, the term "nominal CMAS" refers to the following composition, with all percentages in mole percent: 41.6% silica ($SiO_2$), 29.3% calcia (CaO), 12.5% alumina ($AlO_{1.5}$), 9.1% magnesia (MgO), 6.0% iron oxide ($FeO_{1.5}$), and 1.5% nickel oxide (NiO). It will be appreciated that the nominal CMAS composition given in this definition represents a reference composition to define a benchmark for the substance's CMAS reactivity in a way that can be compared to the CMAS reactivity of other substances; use of this reference composition does not limit in any way the actual composition of ingested material that becomes deposited on the coating during operation which, of course, will vary widely in service.

Furnace cycle testing (FCT): The slotted coupons were subjected to cyclic thermal exposure in a high-temperature furnace. During a 1 hour cycle, the coupons were inserted rapidly into a bottom-loading furnace and held at 1135° C. for 45 min. At temperature, the coupon is essentially isothermal. The slotted coupons were then withdrawn from the furnace and forced-air cooled for 15 min before beginning the next cycle. Specimens were removed from the FCT and examined for spallation after 20 cycles. The samples remained in the test until spallation of 20% of the total TBC coating area; this measurement was used as a gauge of the FCT life.

Example 1: Slotted Vs Unslotted APS-TBC & DVM-TBC (B151106)

Figure 10A:
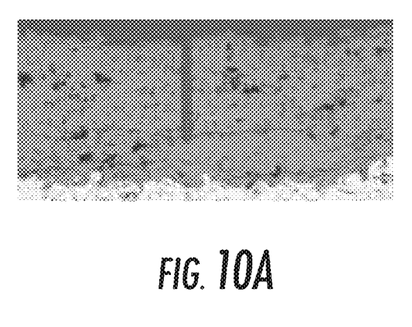
FIG. 10a is a micrograph of a cross section of a coating in accordance with one embodiment of the present disclosure.
Figure 10B:
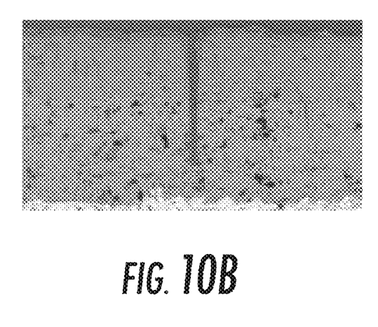
FIG. 10b is a micrograph of a cross section of a coating in accordance with one embodiment of the present disclosure.

The examples described below clearly demonstrate the benefit of slotting and the resulting segmented microstructure, irrespective of TBC thickness and the chemistry. The first slots were formed using high speed diamond saw cutting. The slot spacing was kept constant at 1 mm apart (i.e., about 40 mils) for both types of TBCs (the single layer system and the two layer system). The slot depth was adjusted as a function of the total TBC thickness. The slots in the APS-TBC were 0.30 mm (about 12 mils) deep, and the slots in DVM-TBC were 0.50 mm deep. The nominal slot width was kept constant at 25 μm. Micrographs showing the slotted 8YSZ TBC and the DVM TBC are shown in FIGS. 10A and 10B, respectively. Both slotted samples and unslotted coupons were JETS tested. The results showed that the slotted samples with the preferred architectures survived significantly better than the control samples without any slotting. Typically the JETS test life of the TBC was increased by at least 25%.

Example 2: Effect of Slot Spacing on Furnace Cycle Testing at 2075° F.

Figure 11:
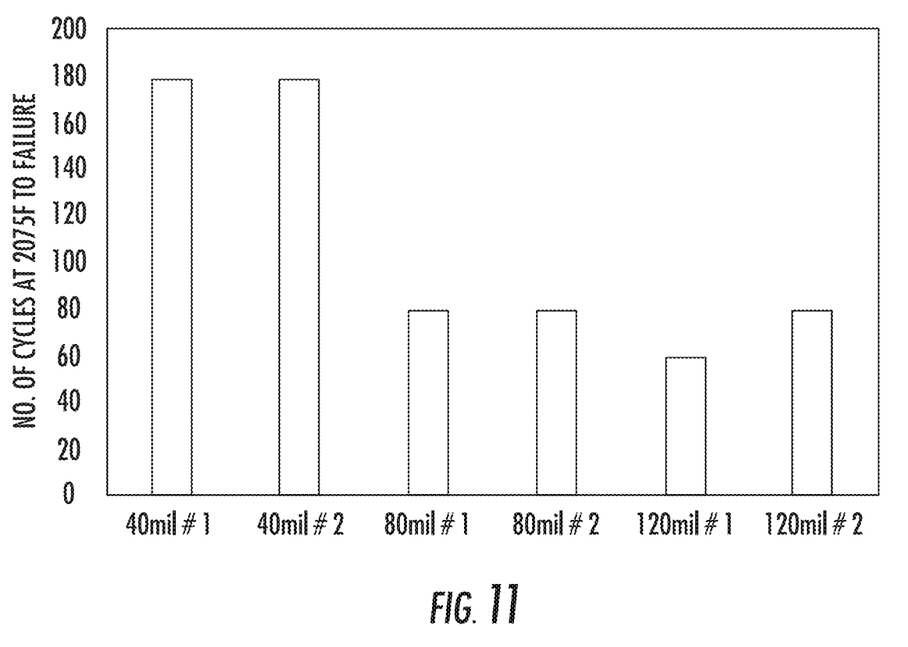
FIG. 11 is a bar graph showing data for two coupons of each of the geometries tested in the Examples.

In order to determine the preferred slot spacing for improved compliance and CMAS resistance, coupons with slot spacing from 40 mils (1 mm wide) to 120 mils (3 mm wide) were investigated. The coupons were air plasma sprayed 8YSZ TBC with a thickness of 0.38 mm. The slots were formed using high speed diamond saw cutting. The slot depth was 0.25 mm and the width was nominally 25 microns. The slots produced 1 mm square segments with a spacing of 25 microns. TBC segments of 2 mm size and 3 mm size were produced and also tested as described below. The slotted coupons were thermally cycled in a FCT furnace. FIG. 11 shows data for two coupons of each of the geometries tested. The FCT procedure is described above. Coupons with 1 mm slot spacing had more than 2× better life than either 2 mm slot spacing or 3 mm slot spacing coupons. The test results indicate an infant mortality risk for the TBC on a component if the FCT life coupons life is below 100 cycles, as is the case for the 2 mm slot spacing or 3 mm slot spacing coupons.

Figure 12:
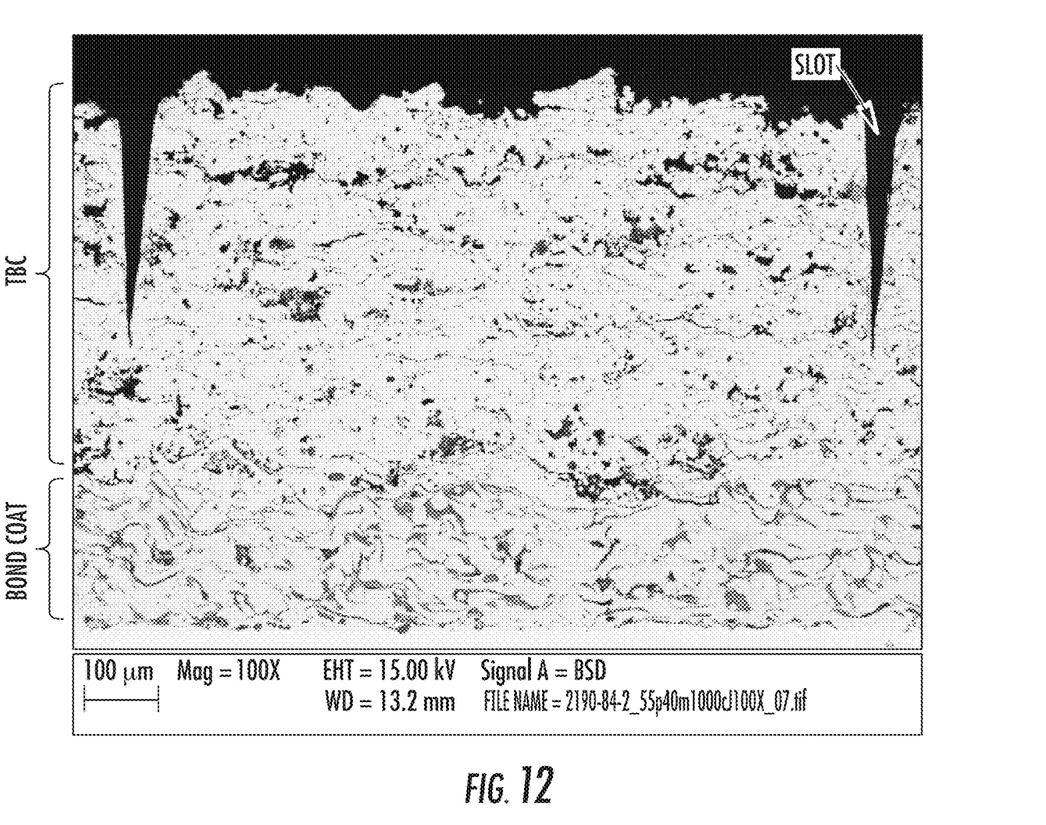
FIG. 12 is a micrograph of the slotted two layer TBC of the Examples.

Example 3: Comparison Between the Slots Produced Using a Picosecond Laser, and the Slots Produced Using a Nanosecond Laser Slotting The results of the present example demonstrate that the improved CMAS resistance provided by the slots and the resulting TBC segments does not depend on the slotting method. Two different laser systems were used to slot the TBCs. One set of coupons were slotted using a picosecond laser, and a second set of coupons were slotted using a nanosecond laser system. The coupons that were produced included the 2-layer DVM 55YSZ with slot spacing of 1 mm and 0.5 mm deep. The slot width was about 75 microns on the top surface of the TBC and about 10 microns at the bottom of the slot. A micrograph of the slotted 2 layer TBC is shown in FIG. 12. Both sets of slotted TBCs were tested together with unslotted TBC baseline coupons using the method described above. Both sets of slotted coupons showed significantly better performance than the baseline coupon without slots. The improved CMAS resistance provided by both the picosecond and the nanosecond slotted coupons were almost the same.

Figure 13:
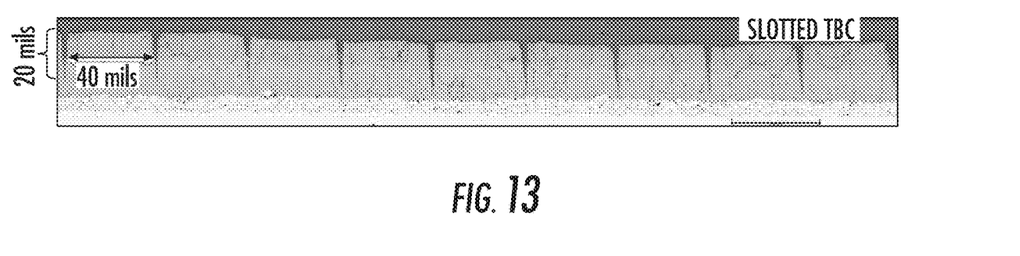
FIG. 13 shows an optical micrograph of slotted the 2-layer DVM 55YSZ with slot spacing of 1 mm and 0.5 mm deep, according to the Examples.

FIG. 13 shows an optical micrograph of slotted 2-layer DVM 55YSZ with slot spacing of 1 mm and 0.5 mm deep. The slot width was about 75 microns on the top surface of the TBC and about 10 microns at the bottom of the slot.

While the invention has been described in terms of one or more particular embodiments, it is apparent that other forms could be adopted by one skilled in the art. It is to be understood that the use of "comprising" in conjunction with the coating compositions described herein specifically discloses and includes the embodiments wherein the coating compositions "consist essentially of" the named components (i.e., contain the named components and no other components that significantly adversely affect the basic and novel features disclosed), and embodiments wherein the coating compositions "consist of" the named components (i.e., contain only the named components except for contaminants which are naturally and inevitably present in each of the named components).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A coated component for a gas turbine engine, the coated component comprising:
    a metal substrate defining an outer surface, the outer surface being a surface of the metal substrate that is facing an engine flowpath, the engine flowpath being a hot gas flow path; and
    a ceramic coating disposed along the outer surface of the metal substrate and exposed to the engine flowpath, the ceramic coating having a thickness, wherein the ceramic coating comprises yttria stabilized zirconia,
    wherein the ceramic coating comprises one or more cooling holes disposed in the ceramic coating and a plurality of slots disposed in the ceramic coating forming segments of ceramic coating material, each slot of the plurality of slots having a length, a width, and a depth,
    wherein each slot of the plurality of slots is arranged such that a direction defined by its depth is perpendicular to a surface of the ceramic coating, wherein the slots are disposed relative to the one or more cooling holes such that the slots do not pass through any of the one or more cooling holes, the slots extending through 80 percent or more of the thickness of the ceramic coating, and wherein each segment of ceramic coating material overlies and defines a segment of the metal substrate, each segment of the metal substrate being substantially planar.

2. The coated component of claim 1, wherein each individual slot in the plurality of slots has a width of about 10 microns to 200 microns and a depth of about 50 microns to about 1000 microns.

3. The coated component of claim 1, wherein each individual slot in the plurality of slots is spaced apart from another slot by about 250 micron to about 300 micron.

4. The coated component of claim 1, wherein the plurality of slots is disposed in a thermal distress zone of the ceramic coating, wherein the thermal distress zone is a zone in the ceramic coating configured to be exposed to temperatures of about 5% or higher than another zone of the ceramic coating during operation of the coated component.

5. The coated component of claim 1, wherein each individual slot in the plurality of slots defines an area having less ceramic coating material by volume compared to the segments of ceramic coating material.

6. The coated component of claim 1, wherein each individual slot in the plurality of slots comprises a parallel sided notch, a notch with a V-shaped profile, a notch with a U-shaped profile, or combinations thereof.

7. The coated component of claim 1, wherein each individual slot in the plurality of slots has a ratio of depth to width of about 2 to about 15.

8. The coated component of claim 1, wherein the ceramic coating comprises a ceramic coating material and a bond coat.

9. A method of forming a coated component comprising:
forming a ceramic coating along an outer surface of a metal substrate, the outer surface being a surface of the metal substrate that is facing an engine flowpath, the engine flowpath being a hot gas flow path; wherein the ceramic coating has a thickness and is exposed to the engine flowpath, the ceramic coating comprising one or more cooling holes disposed in the ceramic coating, and wherein the ceramic coating comprises yttria stabilized zirconia; and forming a plurality of slots along the ceramic coating relative to the one or more cooling holes such that each of the plurality of slots do not pass through any of the one or more cooling holes, the plurality of slots form segments of ceramic coating material, each of the plurality of slots extend through 80 percent or more of the thickness of the ceramic coating, and each of the plurality of slots are arranged such that a direction defined by its depth is perpendicular to a surface of the ceramic coating, wherein forming the plurality of slots to form segments of ceramic coating material includes forming the segments of ceramic coating material such that each segment of ceramic coating material overlies and defines a segment of the metal substrate, each segment of the metal substrate being substantially planar.

10. The method of claim 9, wherein forming the plurality of slots along the ceramic coating comprises forming the plurality of slots in a thermal distress zone, the thermal distress zone being a zone configured to be exposed to temperatures of about 5% or higher than another zone of the ceramic coating during operation of the coated component.

11. The method of claim 9, wherein forming the plurality of slots along the ceramic coating comprises laser-cutting, high speed mechanical saw, or combinations thereof.

12. The coated component of claim 1, wherein the thickness of the ceramic coating is about 381 microns and the slots have a depth of about 304.8 microns, wherein the coated component is a combustor liner or a heat shield for a gas turbine engine.

13. The coated component of claim 1, wherein the thickness of the ceramic coating is about 635 microns and the slots have a depth of about 508 microns.

14. The coated component of claim 1, wherein the plurality of slots and a second plurality of slots form a grid pattern in the ceramic coating.

15. The coated component of claim 14, wherein each slot of the plurality of slots is arranged such that an angle between a direction defined by its length and a direction defined by an engine flowpath is between 10 degrees and 89 degrees, and wherein each slot of the second plurality of slots is arranged such that an angle between a direction defined by its length and the direction defined by the engine flowpath is 90 degrees.

16. The coated component of claim 15, wherein each of the plurality of slots are parallel to each other, and each of the second plurality of slots are parallel to each other.

17. The coated component of claim 2, wherein each individual slot in the plurality of slots is spaced apart from another slot by about 100 microns to about 300 microns.

18. The coated component of claim 1, wherein the ceramic coating surrounding each slot is a continuous coating.

19. The coated component of claim 8, wherein the one or more cooling holes extend through the ceramic coating material and the plurality of slots extend through the ceramic coating material, either partially or fully.

20. A coated component for a gas turbine engine, the coated component comprising:
a metal substrate defining an outer surface, the outer surface being a surface of the metal substrate that is facing an engine flowpath, the engine flowpath being a hot gas flow path; and a ceramic coating disposed along the outer surface of the metal substrate and exposed to the engine flowpath, the ceramic coating having a thickness, wherein the ceramic coating comprises one or more cooling holes disposed in the ceramic coating and a plurality of slots disposed in the ceramic coating forming segments of ceramic coating material, each slot of the plurality of slots having a length, a width, and a depth, wherein the ceramic coating surrounding each slot is a continuous coating, wherein each slot of the plurality of slots is arranged such that a direction defined by its depth is perpendicular to a surface of the ceramic coating, wherein the slots are disposed relative to the one or more cooling holes such that the slots do not pass through any of the one or more cooling holes, the slots extending through 80 percent or more of the thickness of the ceramic coating, and wherein each segment of ceramic coating material overlies and defines a segment of the metal substrate, each segment of the metal substrate being substantially planar.

* * * * *